United States Patent
Eapen et al.

(10) Patent No.: US 11,961,094 B2
(45) Date of Patent: Apr. 16, 2024

(54) FRAUD DETECTION VIA AUTOMATED HANDWRITING CLUSTERING

(71) Applicant: Morgan Stanley Services Group Inc., New York, NY (US)

(72) Inventors: Sujit Eapen, Plainsboro, NJ (US); Sonil Trivedi, Jersey City, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 729 days.

(21) Appl. No.: 17/098,443

(22) Filed: Nov. 15, 2020

(65) Prior Publication Data
US 2022/0156756 A1    May 19, 2022

(51) Int. Cl.
*G06Q 30/00*   (2023.01)
*G06F 18/22*   (2023.01)
(Continued)

(52) U.S. Cl.
CPC ......... *G06Q 30/0185* (2013.01); *G06F 18/22* (2023.01); *G06F 18/23* (2023.01);
(Continued)

(58) Field of Classification Search
None
See application file for complete search history.

(56) References Cited

U.S. PATENT DOCUMENTS

| | | | | |
|---|---|---|---|---|
| 3,859,515 A | * | 1/1975 | Radcliffe, Jr. | G06F 17/145 382/121 |
| 6,424,728 B1 | * | 7/2002 | Ammar | G06V 40/30 382/119 |

(Continued)

FOREIGN PATENT DOCUMENTS

| | | | | |
|---|---|---|---|---|
| AU | 2018203368 B2 | * | 7/2021 | ......... G06K 9/00449 |
| CN | 101482920 A | * | 7/2009 | ......... G06K 9/00416 |
| GB | 2537992 A | * | 11/2016 | ............. G06F 21/32 |

OTHER PUBLICATIONS

AbdAli et al. "Sample records for handwritten signature verification." (Nov. 1, 2014). Retrieved online Aug. 8, 2023. https://www.science.gov/topicpages/h/handwritten+signature+verification (Year: 2014).*

(Continued)

*Primary Examiner* — James A Reagan
(74) *Attorney, Agent, or Firm* — Weitzman Law Offices, LLC

(57) ABSTRACT

A computer-implemented method for automatically analyzing handwritten text to determine a mismatch between a purported writer and an actual writer is disclosed. The method comprises receiving two samples of digitized handwriting each allegedly created by one individual and received and entered into a digital system by another. The method further comprises performing a series of feature extractions to convert the samples into two vectors of extracted features; automatically clustering a set of vectors such that the first vector and the second vector are assigned to the same cluster among multiple clusters, based on vector similarity; and automatically determining that a same individual being associated with both the first and second samples indicates a heightened probability that the individual fraudulently created both samples. Finally, the method comprises automatically transmitting a message to flag additional samples of digitized handwriting entered into a digital system as possibly fraudulent.

18 Claims, 7 Drawing Sheets

(51) Int. Cl.
*G06F 18/23* (2023.01)
*G06F 21/32* (2013.01)
*G06F 21/64* (2013.01)
*G06N 3/04* (2023.01)
*G06Q 10/10* (2023.01)
*G06Q 30/018* (2023.01)
*G06V 30/18* (2022.01)
*G06V 30/262* (2022.01)
*G06V 30/32* (2022.01)

(52) U.S. Cl.
CPC .............. *G06F 21/32* (2013.01); *G06F 21/64* (2013.01); *G06N 3/04* (2013.01); *G06Q 10/103* (2013.01); *G06V 30/18086* (2022.01); *G06V 30/274* (2022.01); *G06V 30/347* (2022.01); *G06V 30/36* (2022.01)

(56) References Cited

U.S. PATENT DOCUMENTS

| | | | | |
|---|---|---|---|---|
| 6,487,310 | B1* | 11/2002 | Bishop | G07C 9/35 |
| | | | | 382/187 |
| 7,430,310 | B2 | 9/2008 | Kotovich et al. | |
| 8,311,973 | B1* | 11/2012 | Zadeh | G06T 7/12 |
| | | | | 706/903 |
| 8,700,905 | B2* | 4/2014 | Guenther | G06F 21/64 |
| | | | | 713/189 |
| 8,873,813 | B2* | 10/2014 | Tadayon | G06V 40/172 |
| | | | | 382/118 |
| 8,885,894 | B2* | 11/2014 | Rowen | G06Q 20/10 |
| | | | | 705/16 |
| 9,846,875 | B2* | 12/2017 | McNeal | G06Q 20/401 |
| 10,089,975 | B2* | 10/2018 | Fume | G10L 13/08 |
| 10,304,054 | B2* | 5/2019 | McNeal | G06Q 20/206 |
| 10,606,955 | B2* | 3/2020 | Jayaraman | G06F 16/334 |
| 10,628,834 | B1* | 4/2020 | Agarwal | G16H 10/60 |
| 10,936,974 | B2* | 3/2021 | Chaudhari | G06V 30/416 |
| 11,074,495 | B2* | 7/2021 | Zadeh | G06F 18/2413 |
| 11,170,162 | B2* | 11/2021 | Hawkes | G16H 20/10 |
| 2004/0049411 | A1 | 3/2004 | Suchard et al. | |
| 2007/0211964 | A1* | 9/2007 | Agam | G06V 10/771 |
| | | | | 382/305 |
| 2011/0238510 | A1* | 9/2011 | Rowen | G06V 40/382 |
| | | | | 705/16 |
| 2014/0079297 | A1* | 3/2014 | Tadayon | G06V 40/172 |
| | | | | 382/118 |
| 2014/0201126 | A1* | 7/2014 | Zadeh | A61B 5/165 |
| | | | | 706/52 |
| 2014/0300554 | A1* | 10/2014 | Samuel | H04W 12/068 |
| | | | | 345/173 |
| 2016/0004422 | A1* | 1/2016 | Cohen | G06F 21/32 |
| | | | | 382/119 |
| 2017/0092262 | A1* | 3/2017 | Pinhasi | G10L 15/02 |
| 2017/0316406 | A1* | 11/2017 | McNeal | G06Q 20/401 |
| 2018/0137350 | A1* | 5/2018 | Such | G06F 18/2413 |
| 2018/0174151 | A1* | 6/2018 | Pham | G06Q 20/34 |
| 2018/0204111 | A1* | 7/2018 | Zadeh | G06V 10/764 |
| 2019/0325163 | A1* | 10/2019 | Sharad | G06F 21/82 |
| 2020/0160086 | A1* | 5/2020 | Florencio | G06V 30/412 |
| 2020/0184278 | A1* | 6/2020 | Zadeh | G06N 3/044 |
| 2020/0242825 | A1* | 7/2020 | Kim | G06F 18/00 |
| 2021/0073514 | A1* | 3/2021 | Sangala | G06F 18/22 |
| 2021/0166013 | A1* | 6/2021 | Tensmeyer | G06N 3/08 |
| 2021/0295035 | A1* | 9/2021 | Shaya | G10L 15/26 |
| 2021/0295103 | A1* | 9/2021 | Tanniru | G06V 10/7747 |
| 2023/0206329 | A1* | 6/2023 | Cella | G06Q 40/04 |
| | | | | 705/37 |

OTHER PUBLICATIONS

Shashi Kumar et al. "Off-line Signature Verification Based on Fusion of Grid and Global Features Using Neural Networks." (2010). Retrieved online Aug. 8, 2023. https://core.ac.uk/download/pdf/72802412.pdf (Year: 2010).*

Janet Fisher et al. "Identifying Personality Traits, and Especially Traits Resulting in Violent Behavior through Automatic Handwriting Analysis." (May 4, 2012). Retrieved online Aug. 8, 2023. (Year: 2012).*

Reference W (continued) https://www.researchgate.net/profile/Vladimir-Kulchitsky/post/Do-you-have-or-know-any-good-recent-paper-comparing-different-methods-for-personalty-traits-recognition-via-handwriting/attachment/59d62eab79197b807798cdbb/AS%3A355152583249922%401461686382408/download/d6.pdf (Year: 2012).*

* cited by examiner

FRAUD DETECTION VIA AUTOMATED HANDWRITING CLUSTERING

FIELD OF INVENTION

This application relates to systems for and methods of automated handwriting analysis related to user authentication, and more specifically, to retrospective fraud detection via correlations within a corpus of signatures and other handwritten markings made on documents that should have been made by different individuals.

BACKGROUND

In the 21$^{st}$ century, competition between organizations for market share has led some of these organizations to provide incentives to salespersons to achieve as many transactions as possible or open as many new accounts on consumers' behalf as possible. In order to meet quotas or earn commissions, salespersons have been known to fraudulently establish transactions, to open additional accounts on behalf of existing customers, or even to fabricate new customers who never existed, hoping to meet a quota despite a lack of any economic activity occurring in the created account. Salespersons might first fill out forms purporting to authorize a financial transaction as if they are the customer, and afterward process the same forms themselves to receive credit for supposedly originating the new account or business.

Detection of fraudulent activity is often delayed because the salesperson may use entirely accurate information when filling out the form, or because an inactive account is not necessarily a cause for suspicion in some industries. Moreover, a salesperson might make detection more difficult by also fraudulently creating the original "signature card" against which future signed forms, also signed by the salesperson, will be compared. Having the fraud be discovered by a customer, government agent, or auditor is not only embarrassing, but also causes reputational damage to the organization and may lead to massive fines, civil lawsuits, or criminal liability for the organization and its members.

Thus, there are advantages to be realized by having an automated system to detect possibly fraudulent documents, without relying on a trusted handwriting sample, and flag the possibly fraudulent documents for further inspection and remediation of the fraud before the fraud causes monetary damage to consumers or reputational and legal damage to the organization.

SUMMARY OF THE INVENTION

A method for automatically analyzing a corpus of handwritten text to determine a mismatch between a purported writer and an actual writer is disclosed. The method comprises receiving a first sample of digitized handwriting and metadata associating the first sample with a first individual who allegedly created the sample and with a second individual who allegedly received the sample from the first individual and entered it into a digital system and the method further comprises receiving a second sample of digitized handwriting and metadata associating the second sample with a third individual who allegedly created the sample and with the second individual who also allegedly received the sample from the third individual and entered it into the digital system. Then the method comprises performing a series of feature extractions to convert the first sample and the second sample into a first vector and a second vector, respectively, of extracted features; automatically clustering a set of vectors comprising the first vector and the second vector such that the first vector and the second vector are assigned to the same cluster among multiple clusters, based on vector similarity; and automatically determining that the metadata associating the second individual with both the first and second samples indicates a heightened probability that the first individual and third individual did not create the first and second samples, and rather that the second individual created both samples. Finally, the method comprises automatically transmitting a message to flag additional samples of digitized handwriting entered into a digital system as possibly fraudulent.

BRIEF DESCRIPTION OF THE DRAWINGS

Other aspects, features and advantages will become more fully apparent from the following detailed description, the appended claims, and the accompanying drawings, provided solely for purposes of illustration without restricting the scope of any embodiment:

DETAILED DESCRIPTION

In order to address the issues described above, a centralized system is provided to receive digitized versions of documents that have been filled in by hand (whether on physical paper that is subsequently scanned or photographed, or input directly via a touchscreen or similar input device for drawing on a digital document), extract handwritten text from the digitized documents, convert the handwritten text to a vectorized format by extracted features of the handwritten text quantified mathematically, cluster vectorized examples of handwritten text that share these features not easily discernable to the human eye, and then determine whether anomalous metadata is associated with the clusters (for example, that a cluster of five similarly handwritten documents are associated with the accounts of five different individuals rather than each being associated with the same individual, which could indicate that a single individual forged all five signatures).

Figure 1:
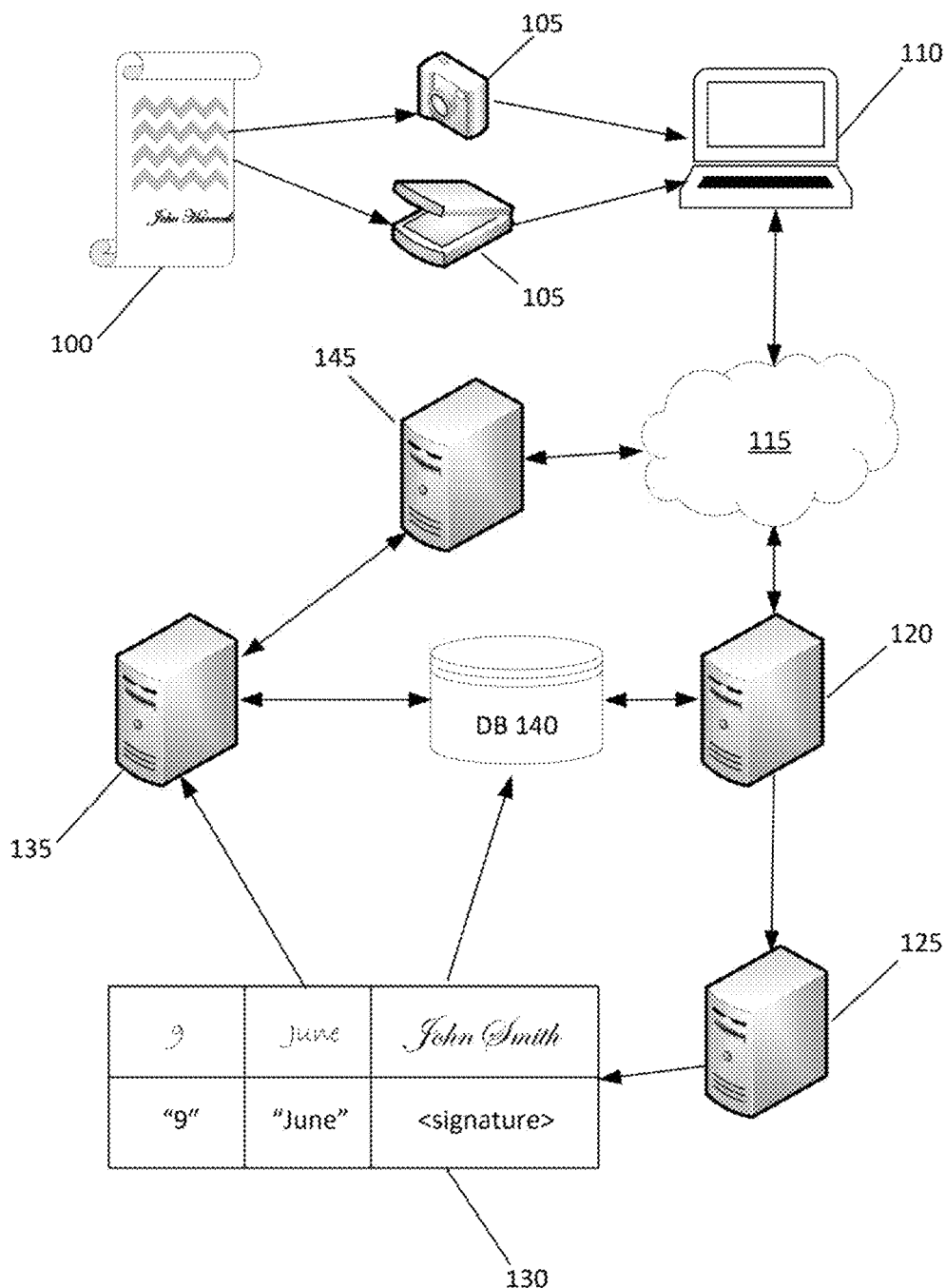
FIG. 1 depicts a network of computing devices to be used in a system for receiving, analyzing, and responding to signatures ostensibly made by authorized individuals but actually made by a malicious individual.

FIG. 1 depicts a network of computing devices to be used in a system for receiving, analyzing, and responding to signatures ostensibly made by authorized individuals but actually made by a malicious individual.

A physical document 100 having handwritten text on at least a portion of its surface may be placed in the vicinity of an optical scanner or digital camera 105 to be scanned, photographed, or otherwise converted to a digital format. In some alternate embodiments, document 100 may instead already be a digital document, such as a PDF (portable document format) or bitmap, that has been augmented via a user physically manipulating a mouse, stylus, touchscreen, or other input device to translate movements of the user's hand into an additional graphical element added to the digital document, approximating how the user's handwritten text would appear.

The digital file representing the physical document 100 is uploaded from the optical capture device 105 to a user computing device 110 and at least temporarily stored on that user computing device 110 before transmission over a network 115 to a user interface server 120. In some embodiments, user computing device 110 may actually incorporate the optical scanner 105 (for example, a camera in a mobile phone) or be communicatively coupled to the optical scanner 105 (for example, connected to a dedicated scanner/photocopier via a wireless connection or USB [universal serial bus] cable); in others, the user computing device 110 may simply receive a file (for example, by email or by FTP [file transfer protocol]) that was scanned by scanner 105 at a previous time or remote location.

Network 115 may be the Internet (or any other network, such as an ethernet, other local area network, wide area network, wireless network, etc.) that connects the user computing device 110 to the user interface server 120, allowing the user interface server 120 to be local, part of a particular remote server cluster, or even part of a cloud-based solution, the configuration of which need not be known at the user computing device 110. The user interface server 120 facilitates some form of receiving documents from the user computing device 110. This may involve, for example, a graphical web interface that prompts a user of the user computing device 110 to select files for upload; a web-based REST API or SOAP API to allow software running on the user computing device 110 to communicate information over HTTP, passively running FTP server software to receive arbitrary files at any time, or even a monitoring server that waits for an email with a document attachment to be sent to a particular address, in response to which it may generate an email in return confirming receipt.

Figure 2:
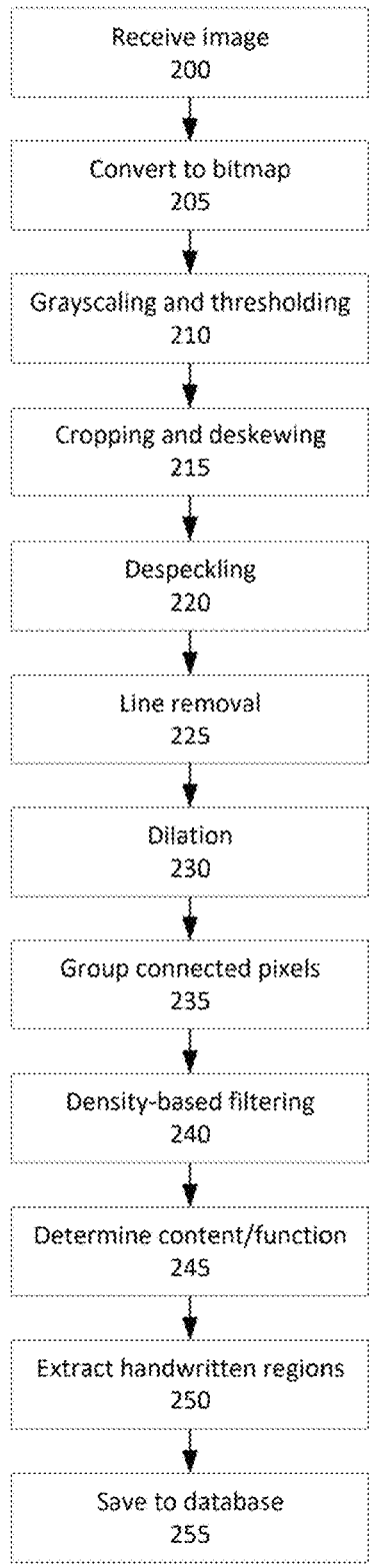
FIG. 2 depicts a method for receiving a document and extracting handwritten textual data from therein.

In any event, one the user interface server 120 receives a document, it is forwarded to a database 140 for long-term storage as well as to an extraction server 125 to be processed for further useful information, according to a method described further, in relation to the discussion of FIG. 2.

Figure 4:
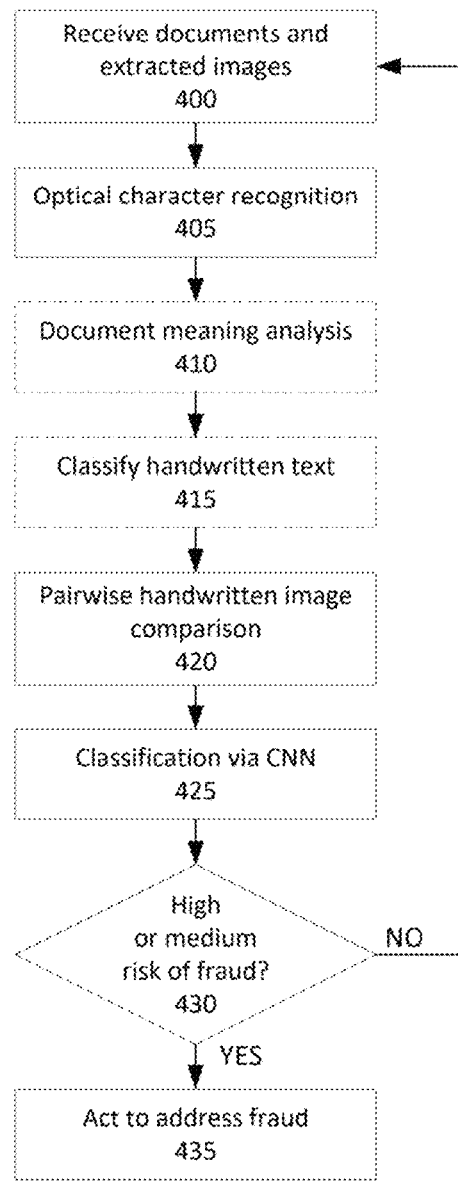
FIG. 4 depicts a method for comparing extracted textual data from multiple documents to cluster them by possible writer and identify possible fraud.

The extraction server 125 will generate a vector 130 of handwritten portions of the document 100 and store that information in the database 140 as well as forward it to an analysis server 140 for fraud detection analysis, according to a method described further, in relation to the discussion of FIG. 4.

Finally, a workflow server 145 is used to track the status of and to create numerous workflows representing tasks requested by various documents 100, performance of these tasks being supposedly authorized by the documents 100 having been filled out and signed by the individual indicated in that document. If the analysis server 140 determines that a document is likely not fraudulent, a workflow on the workflow server 145 may be updated to indicate that a necessary security check has been passed. If instead the analysis server 140 determines that a document has a significant probability of being fraudulent, a workflow on the Work flow server 145 may be updated to halt progress on the task until further investigation has been performed and an authorized individual confirms the task should be completed. Other responses may include updating workflows related to other documents that are associated with a possibly fraudulent document, such as those that have been uploaded by a same individual, or those that have an apparent textual similarity with or match to the possibly fraudulent document, even when uploaded by a different individual.

Any user interface generated by user interface server 115 may be used not only by the user of user computing device 110 to upload the scanned document but also by other representatives within an organization to access information in the database 140 or see the results of textual analysis performed by other computing devices 125 and 135. Other representatives may include a customer service representative who will act upon instructions or information in the document if it is determined to be genuine, or quality assurance personnel reviewing documents that are flagged as possibly fraudulent.

Although a particular division of functions between devices is described in the system above, other configurations are possible in which functions are divided among devices differently. For example, all of the functions of the user interface server 120, the extraction server 125, the analysis server 135, and the workflow server 145, plus the database 140, could theoretically be performed by a single device with multiple threads executing different software modules simultaneously. Further, although each of the servers 120, 125, 135, and 145 and the database 140 are described as if they are one computing device or database each, a cloud-based solution with multiple access points to similar systems that synchronize their data and that are all available as backups to one another is preferable to a unique set of computing devices all stored at one location. The specific number of computing devices and whether communication between them is network transmission between separate computing devices or accessing a local memory of a single computing device is not so important as the functionality that each part has in the overall scheme.

FIG. 2 depicts a method for receiving a document and extracting handwritten textual data from therein.

Initially, the system receives the image data (Step 200) of a document that has been filled out by hand by an individual and captured by the scanner, camera, or other source, or else which has been digitally filled out using a stylus, touchscreen, or other input that preserves the hand movements of the writer. The following steps make no assumptions about the quality of the image and describe a number of pre-processing steps which, if they have already been performed upon the image prior to the system receiving the image, may be unnecessary.

If the image data is not already a bitmap—for example, if it is a JPEG or vectorized image that isn't expressed purely as individual pixels, or it includes image data comprising layers or other features, or if it is received in a format such as a PDF—it is first converted to a bitmap to facilitate subsequent image processing techniques (Step 205).

Next, the image is converted to grayscale and then undergoes Otsu thresholding and image inversion (Step 210). This results in a binary image where every pixel, based on its comparative lightness or darkness to the rest of the image, is assigned a value of either a 0 or 1 to represent pure white or pure black prior to further processing. In other embodiments, a thresholding algorithm other than Otsu's method that results in image binarization may be used. The image is inverted in order to treat foreground (printed) characters as ones in any array rather than zeroes for mathematical purposes, but the methods described below could be modified by one of ordinary skill in the art to work whether the image is inverted or not.

Preferably (though it is not strictly necessary for subsequent steps), the image is cropped and/or rotated to obtain the smallest rectangle containing significant data (Step 215). This rectangle may directly correspond with the grid of the bitmap, or may be rotated at an angle if the document was scanned or photographed at an angle askew from the orientation of the text in the document, After the rotation (if necessary) and the cropping, a rectangular bitmap will be obtained in which significant whitespace along the outer edges has been removed and all text, lines, etc. will be horizontally and vertically aligned with the bitmap, reducing the processing time for subsequent steps. In a preferred embodiment, any rows or columns that are 98-99% empty will be removed, to prevent any speckling or stray marks on a document from making the crop too conservative and preserve too much white space.

Next, the image is de-speckled (Step 220) to remove any pixels that were spuriously picked up during the optical capture by the scanner and that survived the thresholding process, but were not actually printed or written matter on the page. In a preferred embodiment, a non-local image demising algorithm may be used. In other embodiments, other algorithms may be used to clean up the image, such as determining a minimum number of grouped pixels needed to be construed as a possible character or intentional mark.

Next, horizontal and vertical lines may be removed via a convolution matrix kernel (Step 225) selected such that foreground pixels with a number of foreground pixels directly above, below, or to the left or right are replaced with background pixels, but pixels that are not a part of a horizontal or vertical line are retained. For example, a convolution matrix kernel similar to $$\begin{bmatrix} 0 & -1 & 0 \\ -1 & 2 & -1 \\ 0 & -1 & 0 \end{bmatrix}$$

should result in each pixel that is part of a line being removed based on the neighbors above and below or left and right canceling out the value of that pixel.

Next, the image is again processed using a convolution matrix to "dilate" the image (Step 230), smudging each pixel slightly in the vertical and horizontal directions. For example, a convolution matrix kernel similar to $$\begin{bmatrix} 0 & 0.1 & 0 \\ 0.1 & 0.6 & 0.1 \\ 0 & 0.1 & 0 \end{bmatrix}$$

should result in all pixels that are surrounded by like neighbors being unchanged, but all pixels at borders between white and black being partially blended with and influenced by their neighbors.

After dilation, regions of connected pixels in the smudged image are identified and grouped (Step 235) by recursively starting at any given foreground pixel and adding any of its eight neighbors that is also a foreground pixel to the group, and then their neighbors, and so on. For each connected group, a minimal bounding box is drawn around the group and stored in memory. Multiple bounding boxes may be consolidated into a single bounding box if, for example, they overlap, or share Y-coordinates (and are likely to be on a same line of text) while being closer in the X-direction than a predetermined threshold.

In some embodiments, regions of connected pixels may be filtered out from consideration based on a high pixel density (Step 240) in the area of the connected pixels, as dense text is much more likely to be machine generated than to contain a signature or other handwritten text.

Within each of these bounding boxes, one or more methods of determining whether the contents are a signature or other handwritten text may be applied (Step 245), as described below.

First, the overall density of foreground pixels within the bounding box may be measured and compared to the pixel density at other regions of the image. Printed text tends to delineate more neatly into horizontal lines of completely white space above and below lines of dense printing, where neither capital letters nor descenders tend to encroach much into that white space, handwritten text tends to be formed by thin pen strokes that have much greater vertical range, causing a bounding box that contains the text to contain much more white space than a hounding box containing a machine-generated typeface.

Second, the relative or absolute dimensions of the bounding box may be taken into account. Many handwritten words will fit into a bounding box that is much longer than it is tall. A bounding box for handwritten text is also likely to be taller than those of printed text in a smaller font, and longer than the average typewritten word in the document.

Third, the proximity of each bounding box to various predetermined anchors is factored into the determination. Handwritten text is much more likely to be next to, immediately above, or immediately below an anchor word like "Signature", "Date", "Name", or "Address" that is prompting the writer to fill in text in the document, or at least on a same level.

Fourth, a machine learning algorithm may be trained to take in binarized images as vectors and return a likelihood that they represent handwritten text. In a preferred embodiment, the machine learning technique may be a convolutional neural net into which is fed a series of subsections of the image as bit vectors. In a preferred embodiment a multi-class classifier can be trained to differentiate between different classes, such as typewritten words, typewritten numbers, handwritten text, handwritten numbers, and/or handwritten signatures, to determine a relative confidence in classification as being handwritten (and whether that text is a signature or other data) compared to classification as another kind of information.

Based on these factors, an overall confidence level or likelihood that a bounding box contains a signature may be determined, and in a signed document, a particular box (or multiple boxes, if a document has multiple signatories) should have a much higher confidence than the remaining regions that survived the OCR and other image processing steps. The identified regions of the image within the identified bounding boxes are extracted (Step 250) for subsequent use in an analysis of potential fraud. The extracted data is stored in the database 140 (Step 255) for use in future analyses.

Figure 3:
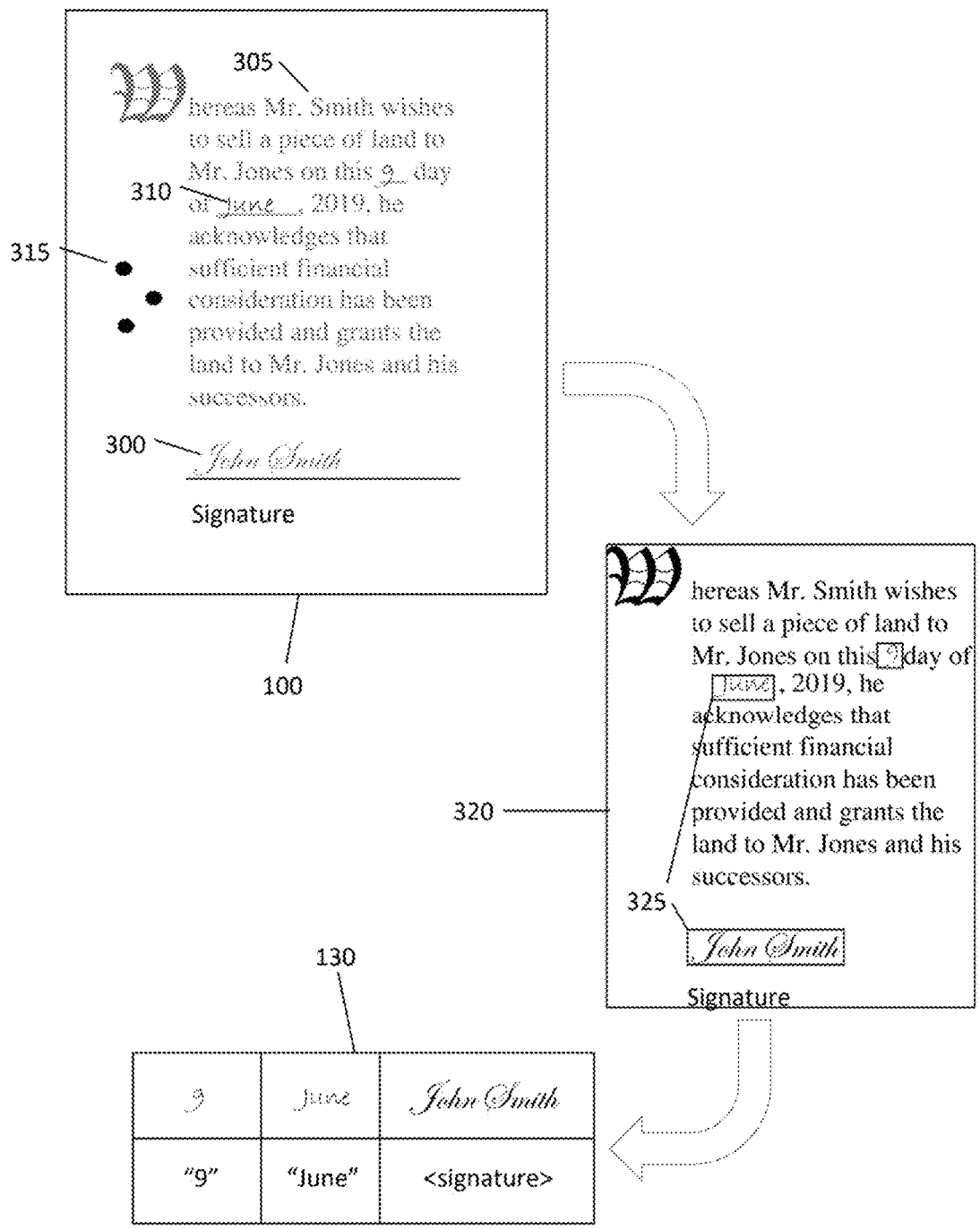
FIG. 3 depicts an example document that could be analyzed according to systems and methods described herein.

FIG. 3 depicts an example document that could be analyzed according to systems and methods described herein.

An initial document 100 may include a number of features when scanned, including a signature 300, various typed words 305, handwritten printed characters 310, and dust, other speckling, or visual artifacts 315 picked up by a scanner. For example, the document might read: "Whereas Mr. Smith wishes to sell a piece of land to Mr. Jones on this 9$^{th}$ day of June, 2019, he acknowledges that sufficient financial consideration has been provided and grants the land to Mr. Jones and his successors" and be signed on a line beneath the printed text.

The document 100 is processed to result in a same document 320, after the image has undergone the previously described steps of grayscaling, thresholding, binarization, despeckling, cropping, and removing lines via convolution matrix. Bounding boxes 325 are determined around words noted to be handwritten based on optical character recognition, pixel density, and other previously described factors.

By extracting the image data in the bounding boxes 325, a data structure 130 is generated, storing each of the graphical representations of handwriting and associating each, based on OCR or on image classification methods previously described, with its printed text equivalent or with its function (i.e., that it is a signature, or that it is another marking, like a checkmark, an "X", a circle, or a strikethrough, that indicates authorization, intent to select, or intent to exclude one option among many). Some text will be important for its content, such as "9" or "June", which should be compared only to other instances where an individual was intending to write "9" or "June", while other text is important primarily for its function; it doesn't matter if one signature is "John Smith" and another is "Harry Doe" if each name is signed in a suspiciously similar way, and it does not matter whether an "X" or a check is used to mark an option if they are marked in a suspiciously similar way.

FIG. 4 depicts a method for comparing extracted textual data from multiple documents to cluster them by possible writer and identify possible fraud.

First, the system receives both a number of original documents 100 and the extracted bitmap data 130 representing the handwritten data from those documents (Step 400).

For each document optical character recognition is performed (Step 405) to determine salient information about the document's purpose or identification as a particular form in a set of forms that are commonly used by many potential individuals.

If the document is not uniquely identified as a particular form, it can be quantified to a limited extent (Step 410) by TF/IDF (term frequency inverse document frequency) analysis to determine the most relevant words in the document and to find documents that, while not identical, also share many of the same keywords. This process can be further augmented by use of the Word2Vec Python library to contextually identify aspects of forms that are different on a surface level but are actually associated with or synonymous to one another, indicating that two documents may be more closely related than a more naïve analysis would indicate.

For each of the previously extracted bitmap images 130, if they are not associated with metadata classifying them already, each is classified (Step 415) according to its content or function.

Figure 5:
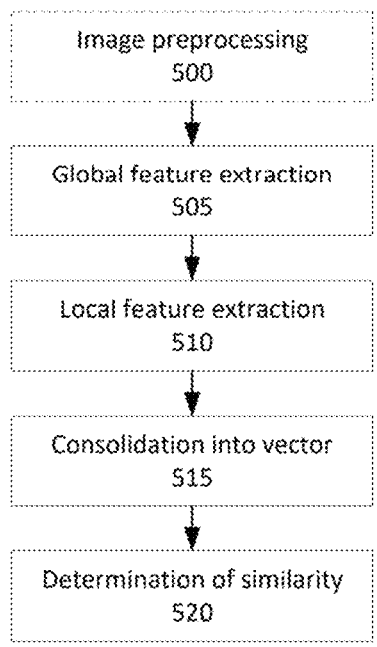
FIG. 5 depicts a sub-method of FIG. 4 specifically for comparing image data for similarity.

Next, the extracted features of two different documents are compared pairwise (for example, "9" with "9", "June" with "June", and signature with signature) according to a similarity function described below. FIG. 5 depicts this sub-method of FIG. 4 specifically for comparing image data for similarity.

In a preferred embodiment, it is already assumed that two images whose comparison is desired have undergone the same preprocessing described in reference to FIG. 2. If necessary, that preprocessing is re-performed (Step 500) to ensure that the two images are appropriate for direct comparison. This may include any, as necessary, of conversion of received image data to grayscale, despeckling the image data, removing horizontal and vertical lines from the data via convolution matrix, cropping the image to remove whitespace, rotating the image if the signature is aligned at an angle rather than horizontal via a deskewing algorithm, and binarization.

In a preferred embodiment, the two images undergo both global feature extraction and local feature extraction. During global feature extraction (Step 505), each image is divided into a series of smaller tiles (for example, 3 pixel by 3 pixel tiles) and these sets of tiles undergo wave extraction via the SIFT and SURF algorithm. A Pearson correlation coefficient is determined from the extracted wave features to allow determination of a p-value that the two signatures are similar.

The local feature extraction (Step 510) may include a variety of different analyses, including one or more of histogram of oriented gradients, a structural similarity analysis, a cosine similarity metric, and/or an energy-entropy comparison between the two images.

A histogram of oriented gradients (HoG) analysis involves generating two HoG vectors for each image, determining the dot product of the two vectors, determining the Frobenius norm of the two vectors, and determining a ratio between the dot product and Frobenius norm.

A cosine similarity metric may involve dividing the image into a fixed number of tiles, calculating the X- and Y-axis centroids of each tile of the two tilesets, and generating two vectors, each with the X- and Y- coordinates of each of the centroids of each image. A similarity can be determined based on the ratio of the dot product to the Frobenius norm of these two centroid vectors.

An energy-entropy metric may compare the total entropy of equivalent tiles from each image (equal to $-\rho \log \rho$, where $\rho$ is the pixel density within the tile) and the total energy of equivalent tiles (equal to the sum of squares of all pixel intensities, divided by the area of the tile).

The values returned by various aspects of the global and local feature extraction may be combined into a single feature vector (Step 515) in order to allow processing of that vector by one or more machine learning techniques to return a final, quantified level of similarity of the handwriting in the two images. A cosine-similarity metric between the two vectors is easy to calculate (Step 520) to quantify that level of similarity. If preferred, a different means of measuring the similarity of the vectors may be used.

Returning to reference FIG. 4, each of these pain, se comparisons of similar content function is computed (Step 420) to obtain a vector of similarity scores. For example, two examples of "9" might have a score similarity of 0.99, two examples of "June" might have a score similarity of 0.81, and two signatures might have a similarity of 0.05.

These comparison scores and the document similarity score are fed into a convolutional neural network (CNN) model to classify (Step 425) the match as high, medium, or low likelihood that two documents were both written by the same individual. In a preferred embodiment, the CNN is trained on three sets or "buckets" of training data: a high likelihood data bucket that includes many examples of the same words, numbers, and signatures that are known to have been made by the same person; a medium likelihood data bucket that includes pairs of different dictionary words written by an individual without the pairing being based on the words' content, as yell as pairs of input that are known to be made by different individuals but are considered almost indistinguishable by a human classifier; and a low likelihood data bucket that includes data known tea have been made by distinct individuals and which is visually distinguishable.

If the CNN classifies (Step 430) the match as low, the comparison ends and a new pair of documents are selected for pairwise comparison (back to Step 400). If the match is medium or high, steps are automatically taken to begin remediating a possible fraud (Step 435). As previously mentioned, this may include a workflow on the workflow server 145 being updated to halt progress on the task until further investigation has been performed and an authorized individual confirms the task should be completed; updating workflows related to other documents that are associated with a possibly fraudulent document, such as those that have been uploaded by a same individual, or those that have an apparent textual similarity with or match to the possibly fraudulent document, even when uploaded by a different individual; or generating an automated message (e.g, an email, a text message, a notification through a web-based user interface, etc.) to indicate the issue and prompt for further investigation.

Rather than make pairwise comparisons between every pair of documents in a database—which may be a Herculean task in terms of computing power expended—the process of determining which documents to compare may be hastened via clustering vectors that comprise information on the documents (extracted in Step 410) and/or the features of individual instances of writing (extracted in Steps 505 and 510). By examining for pairwise comparison only those documents that are sorted into the same clusters, the space to search for fraud is drastically reduced.

Figure 6:
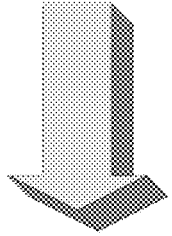
FIG. 6 depicts a sample clustering that may occur according to the disclosed methods and systems.

FIG. 6 depicts a sample clustering that may occur according to the disclosed methods and systems.

Out of millions of vectors to be clustered, there may for example be six particular vectors 600, 605, 610, 615, 620, and 625 that are associated with five different individuals: a John, a Jim, a Tom, a Janet and a different Jim. The vectors further include information such as whether the document contained a handwritten example of the word "June" whether there was a handwritten "9", and whether the document primarily concerned taxes, IRAs, or stocks.

When a k-means clustering is applied to the millions of total vectors, with a relatively large k and clustering being based on the extracted features, a curious outcome occurs. The vectors for Janet 615 and 625 are sorted into a same cluster 635, and the vector for the second Jim 605 is in a cluster of one, but three vectors 600, 620, and 610 end up in a same cluster 630 despite being associated with John, the first Jim, and Tom.

The clustering of Janet's two documents 615 and 625 together is not noteworthy, as her handwriting ought to have similar mathematically extracted features. Moreover, the two documents 605 and 620 signed by different Jims should be in different clusters, as the clustering based on features ignores that both of their signatures contain "Jim" and instead focuses on the mathematically extracted features.

The clustering of three documents believed to have been signed by John, Jim, and Tom is highly irregular, since the clustering indicates very similar handwriting among who appear to be three different men. The CNN classification may be focused on pairwise comparisons among these three documents to determine how likely it is that a single individual actually filled out all three of the documents. If an examination of the metadata shows that the same customer service representative uploaded each of these documents into the system, the existence of that common link between them is highly indicative of fraud and further investigation of any other documents in this cluster and any other documents uploaded by this customer service representative should occur promptly.

Figure 7:
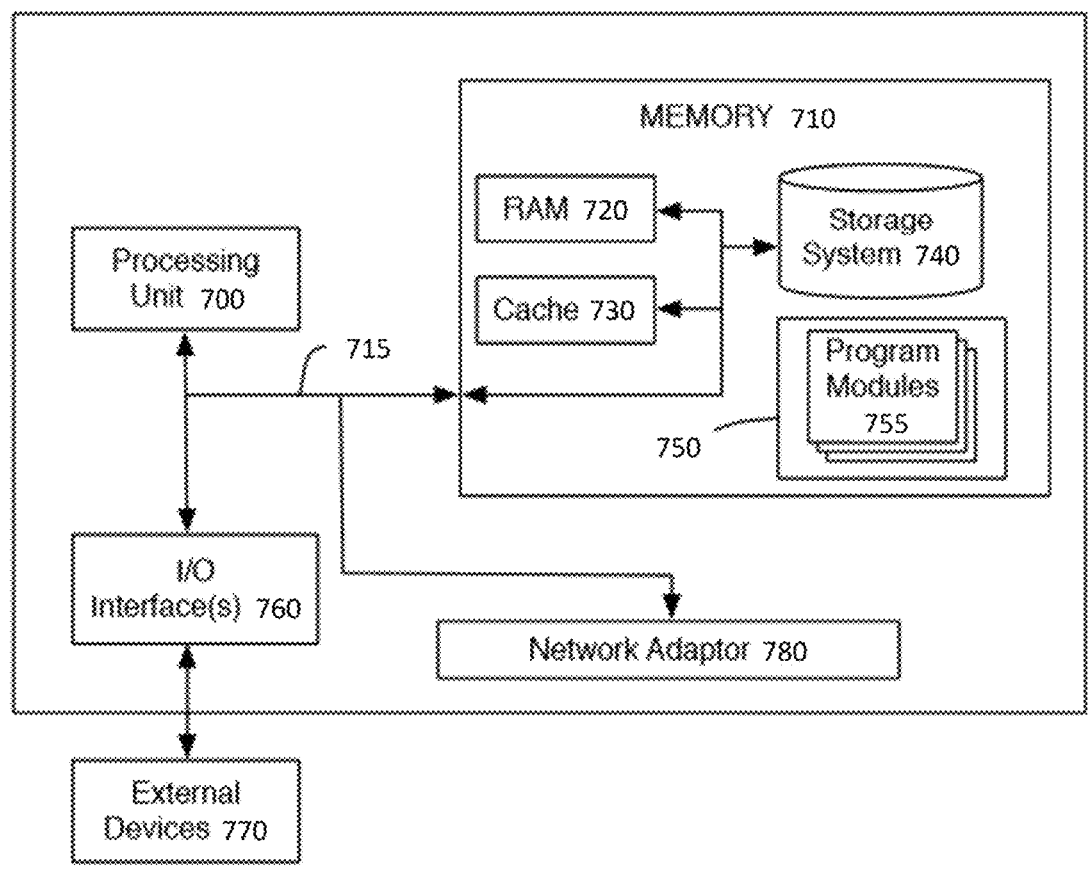
FIG. 7 is a high-level block diagram of a representative computing device that may be utilized to implement various features and processes described herein.

The software-implemented methods described above do not generally rely on the use of any particular specialized computing devices, as opposed to standard desktop computers and/or web servers. For the purpose of illustrating possible such computing devices, FIG. 7 is a high-level block diagram of a representative computing device that may be utilized to implement various features and processes described herein, including, for example, those of computing devices 110, 115, 120, 125, 135, and/or 140. The computing device may be described in the general context of computer system-executable instructions, such as program modules, being executed by a computer system. Generally, program modules may include routines, programs, objects, components, logic, data structures, and so on that perform particular tasks or implement particular abstract data types.

Although FIG. 1 depicts a preferred configuration of computing devices to accomplish the software-implemented methods described above, those methods do not inherently rely on the use of any particular specialized computing devices, as opposed to standard desktop computers and/or web servers. For the purpose of illustrating possible such computing devices, FIG. 7 is a high-level block diagram of a representative computing device that may be utilized for each of the computing devices and/or systems to implement various features and processes described herein. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 7 the components of the computing device may include (but are not limited to) one or more processors or processing units 700, a system memory 710, and a bus 715 that couples various system components including memory 710 to processor 700.

Bus 715 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 700 may execute computer programs stored in memory 710. Any suitable programming language can be used to implement the routines of particular embodiments including C, C++, Java, assembly language, etc. Different programming techniques cast be employed such as procedural or object oriented. The routines can execute on a single computing device or multiple computing devices. Further, multiple processors 700 may be used.

The computing device typically includes a variety of computer system readable media. Such media may be any available media that is accessible by the computing device, and it includes both volatile and non-volatile media, removable and non-removable media.

System memory 710 can include computer system readable media in the form of volatile memory, such as random access memory (RAM) 720 and/or cache memory 730. The computing device may further include other removable/non-removable, volatile/non-volatile computer system storage media. By way of example only, storage system 740 can be provided for reading from and writing to a non-removable, non-volatile magnetic media (not shown and typically referred to as a "hard drive"), Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 715 by one or more data media interfaces. As will be further depicted and described below, memory 710 may include at least one program product having a set (e.g., at least one) of program modules that are configured to carry out the functions of embodiments described in this disclosure.

Program/utility 750, having a set (at least one) of program modules 755, may be stored in memory 710 by way of example, and not limitation, as well as an operating system, one or more application software, other program modules; and program data. Each of the operating system, one or more application programs, other program modules, and program data or some combination thereof, may include an implementation of a networking environment.

The computing device may also communicate with one or more external devices 770 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 760.

In addition, as described above, the computing device can communicate with one or more networks, such as a local area network (LAN), a general wide area network (WAN) and/or a public network (e.g., the Internet) via network adaptor 780. As depicted, network adaptor 780 communicates with other components of the computing device via bus 715. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., tight pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers network adapter card or network interface in each computing/processing device receives computer readable program instructions from the network and forwards the computer readable program instructions for storage in a computer readable storage medium within the respective computing/processing device.

Computer readable program instructions for carrying, out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions). In some alternative implementations, the functions noted in the blocks may occur out of the order, noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system for automatically analyzing a corpus of handwritten text to determine a mismatch between a purported writer and an actual writer, comprising:
a text sample database, storing a plurality of digitized images comprising handwritten text;
one or more processors, and
non-transient memory storing instructions that, when executed by the one or more processors, cause the one or more processors to:
receive a first sample of digitized handwriting and metadata associating the first sample with a first individual who allegedly created the sample and with a second individual who allegedly received the sample from the first individual and entered it into a digital system;
receive a second sample of digitized handwriting and metadata associating the second sample with a third individual who allegedly created the sample and with the second individual, who also allegedly received the sample from the third individual and entered it into the digital system;
automatically perform a series of feature extractions to convert the first sample and the second sample into a first vector and a second vector, respectively, of extracted features, wherein the extracted features comprise at least one of: a histogram of oriented gradients, an energy-entropy comparison, and a Pearson coefficient between sets of extracted waveforms from tiles;
automatically cluster a set of vectors comprising the first vector and the second vector such that the first vector and the second vector are assigned to the same cluster among multiple clusters, based on vector similarity;
automatically determine that the metadata associating the second individual with both the first and second samples indicates a heightened probability that the first individual and third individual did not create the first and second samples, and rather that the second individual created both samples, based at least in part on pairing regions with same semantic contents or functions for pairwise similarity analysis;
automatically transmit a message to flag additional samples of digitized handwriting entered into the digital system by the second individual as possibly fraudulent.

2. The system of claim 1, wherein the instructions, when executed by the one or more processors, further cause the one or more processors to: compute a similarity score between each of the additional samples and the first or second samples; and responsive to a score above a predetermined threshold, transmit a message reporting that an additional sample may be fraudulent.

3. The system of claim 1, further comprising a workflow management server, and wherein the instructions, when executed by the one or more processors, further cause the one or more processors to: transmit a message to the workflow management server to require authorization before proceeding with a workflow that a signature in the first or second sample was intended to authorize.

4. The system of claim 1, wherein the metadata also stores, for each sample, a plurality of indicators of semantic content or function of handwritten text in regions of the sample.

5. The system of claim 4, wherein the function of the handwritten text in one region of the sample is a signature.

6. The system of claim 1, wherein the automatically determining that the metadata indicates a heightened probability that the second individual created both samples comprises is based at least in part on a convolutional neural network classifier into which the samples are input.

7. The system of claim 1, wherein the extracted features comprise a histogram of oriented gradients.

8. The system of claim 1, wherein the extracted features comprise an energy-entropy comparison.

9. The system of claim 1, wherein the extracted features comprise a Pearson coefficient between sets of extracted waveforms from tiles.

10. A computer-implemented method for automatically analyzing a corpus of handwritten text to determine a mismatch between a purported writer and an actual writer, comprising:

receiving a first sample of digitized handwriting and metadata associating the first sample with a first individual who allegedly created the sample and with a second individual who allegedly received the sample from the first individual and entered it into a digital system;

receiving a second sample of digitized handwriting and metadata associating the second sample with a third individual who allegedly created the sample and with the second individual, who also allegedly received the sample from the third individual and entered it into the digital system;

automatically performing a series of feature extractions to convert the first sample and the second sample into a first vector and a second vector, respectively, of extracted features, wherein the extracted features comprise at least one of: a histogram of oriented gradients, an energy-entropy comparison, and a Pearson coefficient between sets of extracted waveforms from tiles;

automatically clustering a set of vectors comprising the first vector and the second vector such that the first vector and the second vector are assigned to the same cluster among multiple clusters, based on vector similarity;

automatically determining that the metadata associating the second individual with both the first and second samples indicates a heightened probability that the first individual and third individual did not create the first and second samples, and rather that the second individual created both samples, based at least in part on pairing regions with same semantic contents or functions for pairwise similarity analysis;

automatically transmitting a message to flag additional samples of digitized handwriting entered into the digital system by the second individual as possibly fraudulent.

11. The method of claim 10, further comprising: computing a similarity score between each of the additional samples and the first or second samples; and responsive to a score above a predetermined threshold, transmitting a message reporting that an additional sample may be fraudulent.

12. The method of claim 10, further comprising: transmitting a message to a workflow management server to require authorization before proceeding with a workflow that a signature in the first or second sample was intended to authorize.

13. The method of claim 10, wherein the metadata also stores, for each sample, a plurality of indicators of semantic content or function of handwritten text in regions of the sample.

14. The method of claim 13, wherein the function of the handwritten text in one region of the sample is a signature.

15. The method of claim 10, wherein the automatically determining that the metadata indicates a heightened probability that the second individual created both samples comprises is based at least in part on a convolutional neural network classifier into which the samples are input.

16. The method of claim 10, wherein the extracted features comprise a histogram of oriented gradients.

17. The method of claim 10, wherein the extracted features comprise an energy-entropy comparison.

18. The method of claim 10, wherein the extracted features comprise a Pearson coefficient between sets of extracted waveforms from tiles.

* * * * *